United States Patent
DeLuca et al.

(10) Patent No.: US 10,909,606 B2
(45) Date of Patent: Feb. 2, 2021

(54) REAL-TIME IN-VENUE COGNITIVE RECOMMENDATIONS TO USER BASED ON USER BEHAVIOR

(71) Applicant: INTERNATIONAL BUSINESS MACHINES CORPORATION, Armonk, NY (US)

(72) Inventors: Lisa Seacat DeLuca, Baltimore, MD (US); Trevor Grant, Chicago, IL (US); David M. Ogle, Powell, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 16/010,952

(22) Filed: Jun. 18, 2018

(65) Prior Publication Data

US 2019/0385212 A1    Dec. 19, 2019

(51) Int. Cl.
  *G06N 20/00* (2019.01)
  *G06F 16/23* (2019.01)
  *G06Q 30/06* (2012.01)
  *G06N 5/02* (2006.01)

(52) U.S. Cl.
  CPC ......... *G06Q 30/0631* (2013.01); *G06F 16/23* (2019.01); *G06N 5/02* (2013.01); *G06N 20/00* (2019.01)

(58) Field of Classification Search
  CPC .... G06Q 30/0631; G06F 16/23; G06N 20/00; G06N 5/02
  See application file for complete search history.

(56) References Cited

U.S. PATENT DOCUMENTS

| | | | |
|---|---|---|---|
| 6,313,745 B1 | 11/2001 | Suzuki | |
| 7,692,536 B2 | 4/2010 | Channell | |
| 2002/0045959 A1 | 4/2002 | Van Overveld | |
| 2013/0218721 A1 | 8/2013 | Borhan et al. | |
| 2013/0254006 A1 | 9/2013 | Braun et al. | |
| 2014/0280113 A1* | 9/2014 | Hohwald | G06F 16/5866 707/728 |
| 2015/0145671 A1 | 5/2015 | Cohen et al. | |
| 2015/0170252 A1 | 6/2015 | Koo Tze Mew | |

(Continued)

FOREIGN PATENT DOCUMENTS

CN    201984528 U    9/2011

*Primary Examiner* — Jay A Morrison
*Assistant Examiner* — Antonio J Caiado
(74) *Attorney, Agent, or Firm* — Stephanie Carusillo, Esq.; Wayne F. Reinke, Esq.; Heslin Rothenberg Farley & Mesiti P.C.

(57) ABSTRACT

User behaviors are monitored, by machine logic, during a visit to a venue by a user, the user behaviors associated with user interactions with items in the venue, a location of the items being tracked. In real-time, based, at least in part, on the user behaviors and the items, a subsequent behavior of the user is predicted, by machine logic, the predicting resulting in predicted behavior(s). Cognitive recommendations are provided, by machine logic, to the user in real-time during the visit, the cognitive recommendations corresponding to additional item(s) based, at least in part, on the predicted behaviors and the items. Machine learning is used to train a system for facilitating the noted aspects, as well as to update training.

17 Claims, 8 Drawing Sheets

(56) References Cited

U.S. PATENT DOCUMENTS

| | | | |
|---|---|---|---|
| 2015/0356626 A1* | 12/2015 | Chawla | H04W 4/025 |
| | | | 705/14.66 |
| 2017/0091850 A1* | 3/2017 | Alvarez | H04W 4/30 |
| 2017/0169470 A1* | 6/2017 | Deluca | H04L 67/12 |
| 2018/0011941 A1 | 1/2018 | Cypher et al. | |
| 2018/0060503 A1* | 3/2018 | Allen | G16H 50/30 |
| 2018/0300788 A1* | 10/2018 | Mattingly | G06Q 30/0625 |

\* cited by examiner

REAL-TIME IN-VENUE COGNITIVE RECOMMENDATIONS TO USER BASED ON USER BEHAVIOR

BACKGROUND

The present disclosure relates to providing item recommendations to users. More particularly, the present disclosure relates to providing real-time in-venue cognitive item recommendations to users based, at least in part, on user behavior(s).

Retail "brick and mortar" stores have seen a decline in foot traffic and sales in recent years. This is thought to be mainly due to the increased use of online shopping by consumers. It has become clear that the retail industry cannot simply compete with lower prices; retail stores have more overhead costs than purely online stores. Thus, the retail industry has been looking for ways to make the retail shopping experience better for the shoppers, while also boosting sales.

At the same time, there is an incredible amount of untapped data that is generated every second based on real-life user behaviors with in-venue items (e.g., products) such as clothing tried on within dressing/fitting rooms. Understanding, even anonymously, what customers are trying on, touching, feeling, and eventually purchasing is often not tracked.

SUMMARY

Shortcomings of the prior art are overcome, and additional advantages are provided, through the provision, in one aspect, of a computer-implemented method of providing recommendations. The computer-implemented method may include, for example: monitoring, by machine logic, during a visit to a venue by a user, at least one user behavior associated with one or more user interactions with one or more items in the venue, wherein a location of the one or more items is tracked within the venue; predicting, in real-time, by machine logic, based, at least in part, on the at least one user behavior and the one or more items, at least one subsequent behavior of the user, the predicting resulting in at least one predicted behavior; and providing, by machine logic, one or more cognitive recommendations in real-time to the user during the visit, the one or more cognitive recommendations corresponding to at least one additional item based, at least in part, on the at least one predicted behavior and the one or more items.

In another aspect, a system for providing recommendations may be provided. The system may include, for example, memory(ies), at least one processor in communication with the memory(ies). Further, the system may include program instructions executable by the one or more processor via the memory to perform a method. The method may include, for example: monitoring, by the system, during a visit to a venue by a user, at least one user behavior associated with one or more user interactions with one or more items in the venue, a location of the one or more items being tracked within the venue, and predicting, by the system, in real-time, based, at least in part, on the at least one user behavior and the one or more items, at least one subsequent behavior of the user, the predicting resulting in at least one predicted behavior. The method may further include, for example, providing, by the system, one or more cognitive recommendations in real-time to the user during the visit, the one or more cognitive recommendations corresponding to at least one additional item based, at least in part, on the at least one predicted behavior and the one or more items.

In a further aspect, a computer program product may be provided. The computer program product may include a non-transitory storage medium readable by a processor and storing instructions for performing a method. The method may include, for example: monitoring, by machine logic, during a visit to a venue by a user, at least one user behavior associated with one or more user interactions with one or more items in the venue, a location of the one or more items being tracked within the venue, and predicting, in real-time, by machine logic, based, at least in part, on the at least one user behavior and the one or more items, at least one subsequent behavior of the user, the predicting resulting in at least one predicted behavior. The method may further include providing, by machine logic, one or more cognitive recommendations in real-time to the user during the visit, the one or more cognitive recommendations corresponding to at least one additional item based, at least in part, on the at least one predicted behavior and the one or more items.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
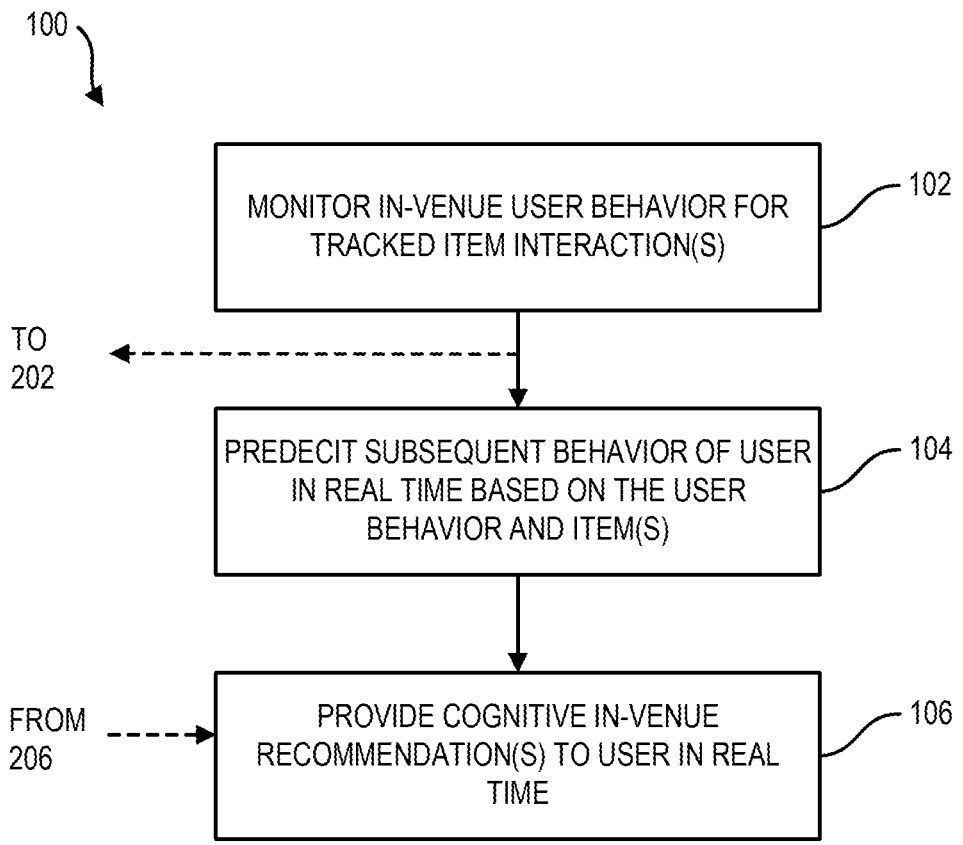
FIG. 1 is a flow diagram for one example of a computer-implemented method of providing recommendations, in accordance with one or more aspects of the present disclosure.

Disclosed is the computer-implemented provision of cognitive recommendations in real-time to a user while visiting a venue, the cognitive recommendations based, at least in part, on user behavior. On a visit to the venue, a user is monitored for user behaviors associated with interactions of the user with items at the venue. A location of the items is tracked and the items and user behaviors may be stored in a user behavior database. Information about the user may also be stored in the user behavior database, to be used, in part, in making the cognitive recommendations, for example, an identification of the user (anonymous or not), physical characteristics of the user. Further, additional information may be associated with the user in the database, for example, a location of the venue visited by the user and/or may be used, in part, in making cognitive recommendations.

In addition, providing the cognitive recommendations may include searching cross co-occurrence matrices in making the cognitive recommendations. Based, at least in part, on the user behaviors and the items interacted with, a subsequent behavior of the user is predicted in real-time during the visit. The prediction may be made employing a predictive model trained using machine learning. The cognitive recommendations correspond to items not yet interacted with by the user and are provided to the user in real-time based, at least in part, on the predicted behavior of the user and the items interacted with by the user. The cognitive recommendations may be continually or periodically updated during the user's visit to the venue. The monitoring, predicting and providing the cognitive recommendations are performed by a processor, in communication with a memory storing instructions for the processor to carry out the monitoring, predicting and providing of cognitive recommendations to the user.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, the term "cognitive recommendations" refers to the use of cognitive computing in making item recommendations to users in real-time while in a venue. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

Where the disclosure uses the plural of an aspect, it will be understood that the singular could instead be used and vice-versa.

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Certain embodiments herein may offer various technical computing advantages involving computer advantages to address problems arising in the realm of computer networks and computer systems. Embodiments herein employ cognitive computing to provide real-time cognitive recommendations of items in a venue while a user is visiting, based, at least in part, on user behaviors during the visit. Embodiments herein can employ machine learning processing to improve the cognitive recommendations over time. A user behavior database can use a cross co-occurrence model and matrices trained by machine learning to intelligently make cognitive recommendations to users.

FIG. 1 is a flow diagram 100 for one example of a computer-implemented method of providing recommendations for items in a venue to users in real-time while visiting the venue, in accordance with one or more aspects of the present disclosure.

In one example, the computer-implemented method of providing recommendations includes monitoring user behavior(s) related to user interaction(s) with tracked item(s). The monitoring may be accomplished using, for example, a venue system while visiting a venue, 102. The venue system employs machine logic and sensor-based devices (e.g., digital cameras) to monitor the user behavior(s). For example, each item interacted with by the user can be marked as a "view" behavior by the venue system (e.g., picking up and inspecting a piece of clothing or bringing a piece of clothing into a dressing room). Of course, the monitoring aspect applies to any type of item in any type of venue, not just clothing at a clothing store. Other item types can include, for example, sports equipment, groceries, tires, shoes or plumbing supplies. The method further includes predicting in real-time subsequent behavior(s) of the user while visiting the venue, based, at least in part, on the monitored user behavior(s) and the item(s) interacted with by the user, 104. The prediction may be made employing a predictive model trained using machine learning. The method also includes providing cognitive recommendation(s) to the user in real-time during the visit to the venue, 106. The cognitive recommendation(s) correspond to additional item(s) based, at least in part, on the predicted subsequent behavior(s) and the item(s) interacted with by the user.

As items leave the user's person (e.g., handing to an assistant to return, returning to a rack, etc.), that action may be recognized, for example, as a "not interested" action (similar to a "cart abandoned" action online). Such actions, as well as others (e.g., purchases, views, etc.) may be, for example, stored in a database. In another example, such actions can also be associated with the user in a database. In a further example, as more item(s) in a particular category are identified, the item(s) may be saved as a real-time preference, for example, most of what the user is trying on are pants. The color choices identified may be considered, for example, a real-time preference/behavior, such as, for example, the user tends to try on blue shirts and pink jeans.

In one embodiment, monitoring the user while visiting the venue (also referred to herein as "in-venue") may be accomplished by, for example, using one or more cameras or other monitoring devices in conjunction with, for example, item location tracking. The cameras or other monitoring devices can be used, for example, to notify a venue system (described below with respect to FIG. 3) that a user has arrived at a venue. The item location tracking can be accomplished using, for example, Global Positioning System (GPS) based tracking, WIFI-based tracking or tracking based on short-range communication technology, e.g., using Radio Frequency Identification (RFID) technology, Bluetooth technology, Near-Field Communication (NFC), or any combination thereof. As one skilled in the art will know, WIFI is a wireless protocol for local area networking with connected devices based on the IEEE 802.11 standards.

The Global Positioning System (GPS) is a satellite-based radionavigation system owned by the United States government and is a global navigation satellite system that provides geolocation and time information to a GPS receiver anywhere on or near the Earth where there is an unobstructed line of sight to four or more GPS satellites. Radio-Frequency Identification (RFID) is the use of radio waves to read and capture information stored on a tag or label attached to an object. A tag or label can be read from up to several feet away and does not need to be within direct line-of-sight of the reader to be tracked. Lastly, Near-field Communication (NFC) is a set of communication protocols that enable two electronic devices, one of which is usually a portable device such as a smartphone or tablet, to establish communication by bringing them within a very short distance, e.g., within 4 cm (1.6 in), of each other.

Figure 2:
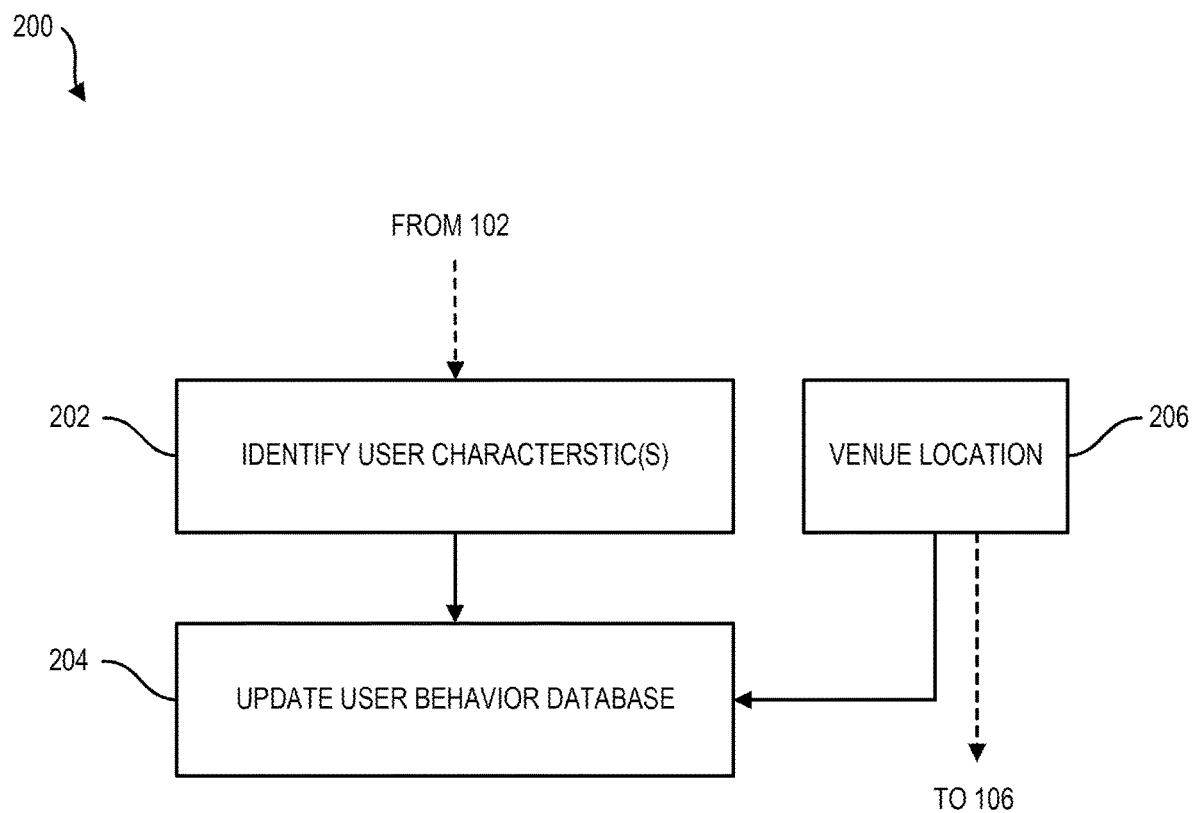
FIG. 2 is a flow diagram for one example of additional aspects of the computer-implemented method described with regard to FIG. 1.

FIG. 2 is a flow diagram 200 for one example of additional aspects of the computer-implemented method described with regard to FIG. 1.

Figure 3:
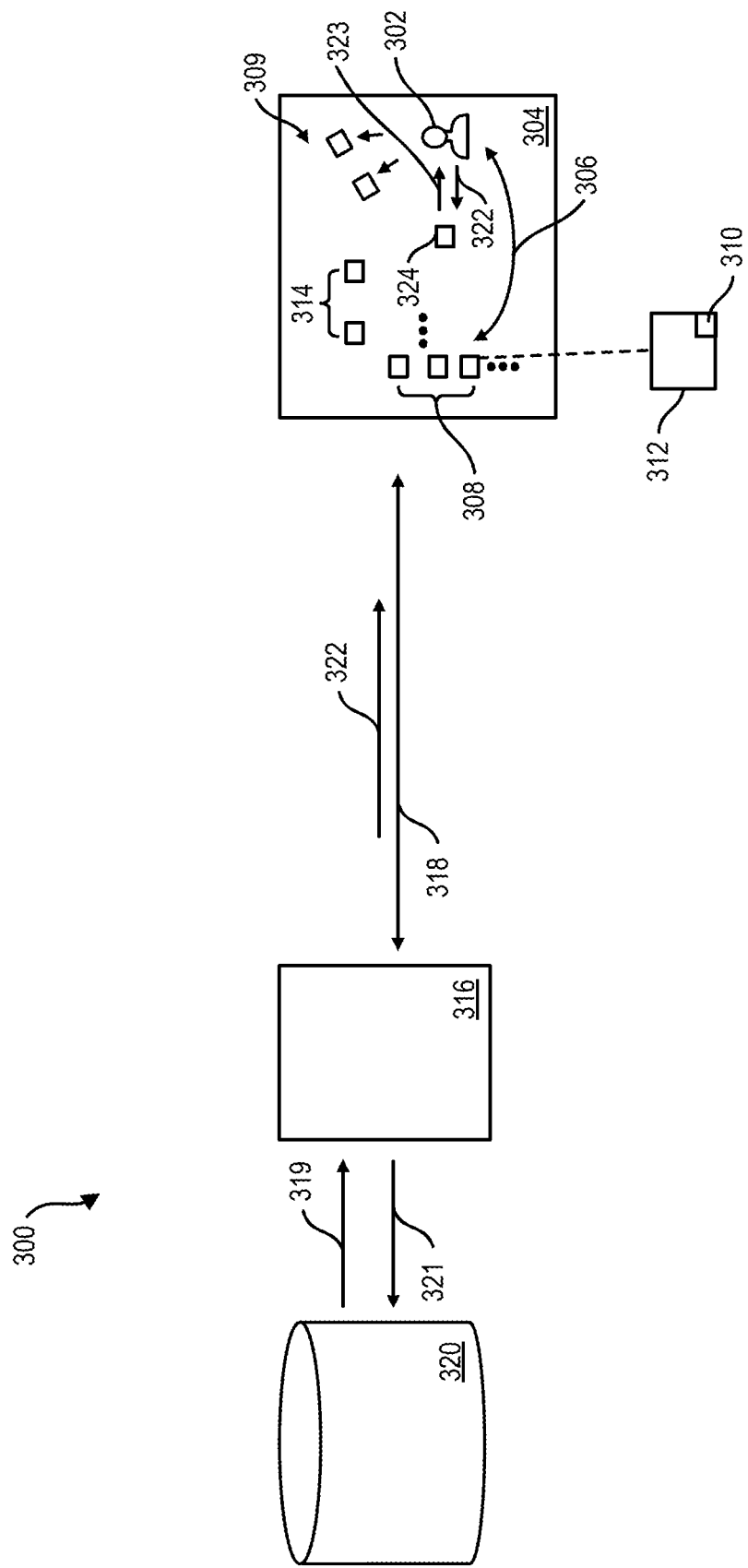
FIG. 3 is a modified block diagram of one example of a venue system, in accordance with one or more aspects of the present disclosure.

In one embodiment, one or more identifying characteristics of the user may be observed and/or provided by the user, 202, to, e.g., a venue system described with respect to FIG. 3. In one example, user characteristic(s) may be stored in a user behavior database, 204. For example, a name, user name, screen name, email address, text number or an ID number may be provided by the user or, for example, previously associated with the user. Alternatively, the user may be identified automatically based on, for example, camera-based recognition (e.g., face detection), based on wearable technology on the user or using a personal computing device of the user (e.g., a smartphone). The user identifying characteristic(s) may include, for example, descriptive information regarding the user, for example, gender, height, approximate size (e.g., if the items are clothing or other wearables) and/or a current style preference, e.g., using camera-based recognition.

In another example, the user may choose to, for example, connect one or more social media account(s) of the user to the venue (e.g., "like" the venue, or allow the venue to become a "friend" or "follower" and/or vice-versa). If the user optionally identified themselves, using, for example, a name, user name, screen name, email address, text number or ID number, additional information about the user, e.g., previously stored user behaviors and/or associations can be employed to further personalize the recommendations. Of course, the user may be anonymous by default or choose to be anonymous, where given the option, though that reduces the level of personalization of the recommendation(s). In another example, a venue location 206 may be associated with the user and also stored in the user behavior database.

As real-time user behaviors are gathered, a recommendation may be continually or periodically updated and made available to the user for increased sales opportunities, e.g., upselling and cross-selling. The recommendation can be presented, for example, through a display-based connected device, e.g., a smart mirror, a tablet, smartphone, kiosk, hologram, augmented reality, virtual reality, etc. The display-based connected device may be, for example, interactive with users. The recommendation to the user may be, for example, in the form of a push message (with or without an image or video component) or updated website or app interaction. Periodically, the real-time user behaviors may then be used to retrain the system and create a new cross co-occurrence (CCO) model and matrices to drive the recommendations using existing software such as, for example, APACHE MAHOUT™ from The APACHE® Software Foundation (Wakefield, Mass.) or IBM® Cognitive Recommendations, which employs APACHE MAHOUT™.

In one example, a simple co-occurrence algorithm may be described using an equation:

$$r=[A^tA]h_a$$

where "r" is a recommendation; "$h_a$" is a user's history of some primary action (e.g., a purchase history); "A" is a history of all users' primary actions and, in one example, matrix "$A^tA$" compares column to column using, for example, a log-likelihood based correlation test. In addition, all information known about a user (e.g., in-venue behaviors) can be used to find correlations between different behaviors, known as a cross-occurrence, information such as, for example, purchase behavior, view behavior, category-preference, location-preference, device-preference, etc. For example, the basic equation can be expanded for different behaviors:

$$r=[A^tA]h_a+[A^tB]h_b+[A^tC]h_c$$

where $h_a$-$h_c$ are user histories of different primary actions or behaviors.

In one embodiment, a system to facilitate a computer-implemented method of providing recommendations can include at a high level, for example, a front end, a back end, a backbone and a search engine. A "front end" in this context refers to an intake module for user behavior and related data. In one example, the front end can be APACHE MAHOUT™ by The APACHE® Software Foundation (Wakefield, Mass.), which is a distributed linear algebra framework and mathematically expressive domain specific language. It serves as a scalable machine-learning library. A "back end" in this context refers to a cluster-computing framework; it is a general purpose "big data" processing engine. Some common uses of such a back end include, for example, interactive queries across large data sets and machine learning. A "backbone" in this context refers to software for use with big data analytics. In one example, HADOOP™ by The APACHE® Software Foundation can serve as the backbone. A "search engine" in this context refers to a large-scale enterprise search platform, for example, SOLR™ by The APACHE® Software Foundation.

Interaction between the user and the venue system can be facilitated through an intermediary, using, for example, a web page associated with the venue or a service provider of the venue. In one example, the web page can be displayed on a venue-provided personal electronic device or on a computer in the venue (e.g., a kiosk or other display-based device that may or may not be interactive). As another example, the web page can be displayed on a user device, e.g., a smartphone or tablet of the user. In another example, the interaction can be facilitated using, for example, a computer application, an online application page (e.g., a "Web app"), along with some type of interactive surface or projection (hologram, augmented reality, virtual reality, etc.) within the venue. In one example, the interactive surface can take the form of a dressing room mirror able to display text and/or images. In another example, the interaction can be voice-based. For example, an automated assistant's voice can speak to a user, either out loud or using head phones or other personal listening device, and a system associated with the automated assistant's voice can cognitively interpret user speech, e.g., voice commands and/or answers to questions posed. In that regard, in one example, the system, through the automated assistant's voice, can ask questions of the user to help refine a recommendation. As used herein, the term "interactive device" refers to anything used to facilitate interaction between the user and the venue system.

In one example, predicting a subsequent behavior of the user can be accomplished by, for example, employing a predictive model trained using machine learning. The data used for training can include, for example, a history of behaviors for the user and/or user behaviors of one or more other users. The predictive model can be based on, for example, analyzing the same or similar historical behaviors for a subsequent behavior most often observed. For example, a user's history of behaviors may indicate that, for example, with respect to clothing, the user tends to try on a particular clothing type more than others (e.g., casual shirts). Thus, the cognitive recommendation may be additional casual shirt(s). In another example, the user behavior(s) may be compared to other users (e.g., a peer group or aggregate users) in order to, for example, identify a most often observed behavior following, for example, a last behavior of the user or a series of behaviors of the user.

In one example, current in-venue user interactions, items interacted with and optional location information, are input into one or more cross co-occurrence matrices and used to do a search (i.e., a cross co-occurrence query) for similar interactions by other users. The results of the search are then used to formulate a recommendation.

In one real-world example, a user visits her favorite dress shop to find a new dress for an upcoming event. She picks a few interesting ones off the racks and brings them into the dressing room. The behavior of bringing the dresses into the room is captured. The room recognizes the dresses through RFID tags on the dresses. A smart mirror in the dressing room displays to her cognitive recommendations based on the dresses she has brought in. As she starts trying on the chosen dresses, she places the ones she likes in one pile and the ones she does not like in another pile or hands the ones she doesn't like back to a store associate to return. The system recognizes the "like" and "don't like" user behaviors and adjusts the recommendations in real-time based on those behaviors. The user sees a new recommendation for another dress based on what she likes and doesn't like. She clicks the "Try on" button and a store associate brings her the dress, in her size.

While the example above includes a fitting room or dressing room, it is only one example and the method can be used in other situations. Any space where a customer is making choices in real-time about what they will buy, based on interactions with items, for example, handling, trying out, trying on, or sitting on the items. The venues can also be varied and not just clothing stores, for example, furniture store showrooms, kitchen remodeling showrooms, linen showrooms, etc. This may also be useful when people bring item(s) home (e.g., stitch fix, or clothing parties that are held in their home); one does not need a "dressing room." Further, the method can be used with any behaviors that can be linked or tracked to a user.

In one example, using the fitting/dressing room example, the user behavior input data for training may, for example, take the following form:
anonymousX,view,product123
anonymousX,like,product123
anonymousX,view,productABC
anonymousX,dislike,productABC
anonymousX,category,jeans
anonymousX,colorpref,blue
anonymousX,city,Austin
anonymousX,state,Texas
anonymousX,category,dresses
anonymousX,view,product456
anonymouxX,purchase,product456

These behaviors, as described above, can be fed into the venue system to help drive the cross co-occurrence matrix. For example, a call to retrieve the recommendations based on these live behaviors might have a payload such as: {"ibmcartPurchaseItem":["product456"], "ibmproductView":["product123","productABC","product456"],"city": ["Austin"],"state":["Texas"],"gender":["female"],"like": ["product123"],"dislike":["productABC"],"category": ["jeans","dresses"],"colorpref:["blue"], "solrnode": "cogrecs"}

The venue system then performs a query (e.g., a query to SOLR™ by The APACHE® Software Foundation) using the above parameters to return a list of products to recommend to the user. The result is a unique, customized set of recommendations.

FIG. 3 is a modified block diagram of one example of a venue system environment 300, in accordance with one or more aspects of the present disclosure. In this example, a user 302 is visiting a venue 304. The venue may be, for example, a retail establishment with items for sale. The user is interacting 306 with one or more items 308 for sale in the venue. The behaviors of the user, e.g., the interactions with the item(s), are monitored. In one example, the monitoring can be accomplished using one or more cameras 309 that track the user and the interactions/behaviors. These behaviors can include anything appropriate for the particular type of items and venue. For example, the venue could be a retail shoe store with the items being shoes of various types, colors, sizes, styles, etc. Appropriate behaviors for a retail shoe store can include, for example, trying on shoes, browsing racks of discounted shoes, picking up shoes, buying shoes, placing shoes within a shopping cart, removing shoes from the shopping cart, trying on a pair of shoes and walking around the store, trying on a pair of shoes with a second clothing option, exchanging a pair of shoes for a new size of the same shoe, and exchanging a pair of shoes for a new color of the same shoe. In another example, the venue is a retail furniture store. Appropriate user behaviors for a retail furniture store can include, for example, sitting on a couch or chair, inspecting price tags, focusing on a particular type or style of furniture and buying furniture.

In some manner, a location of the items within the venue is tracked. In one example, the tracking mechanism uses RFID technology and includes tags or labels 310 physically associated with the various items, e.g., item 312. The RFID tracking also includes various readers 314 dispersed throughout the venue, multiple readers are used because RFID is a short-range technology. The user interactions/behaviors and item locations within the venue are provided to a computer system or controller 316, which, in this example, is external to the venue, e.g., in a cloud computing environment, but could instead be located elsewhere in a physical location within the venue. The information may be provided to the system via a connection 318, which, in one example, includes the Internet but could instead by another closed or open network. The information may also be stored 319 by the system (and read 321 by the system) in a user behavior database 320.

The information may also include, for example, a location of the venue, user identification and/or user characteristics. In real-time, cognitive recommendations 322 are provided to the user in some matter, for example, via some type of display 324, e.g., a screen of a smartphone or tablet, a mirror or fixed display within the venue closest to the user. In one example, if interested in a received recommendation, the user may indicate so (e.g., by touch 323) to the display and the associated item may be provided in some fashion to the user, for example, by an associate of the venue (e.g., an employee) or by some automated system (e.g., robotic and/or drone based).

In one embodiment, rather than the venue monitoring for arrival of a user, where a user arrives at a venue with a device having a display, the device may be configured to, for example, send location data to the venue system, e.g., periodically or, as another example, in response to a signal emitted by the venue upon entering the venue. In another example, the user may arrive with a mobile computing device (e.g., a smartphone) and communicate location data using, for example, an application on the smartphone and making use of, for example, GPS of the mobile computing device.

The venue system is trained using machine learning and user behavior data. As the user behavior database grows, periodically repeat machine learning to further train (or retrain) the system and create new cross co-occurrence model and matrices to drive recommendations, for example, using existing APACHE MAHOUT™ by The APACHE® Software Foundation or IBM Cognitive Recommendations.

Figure 4:
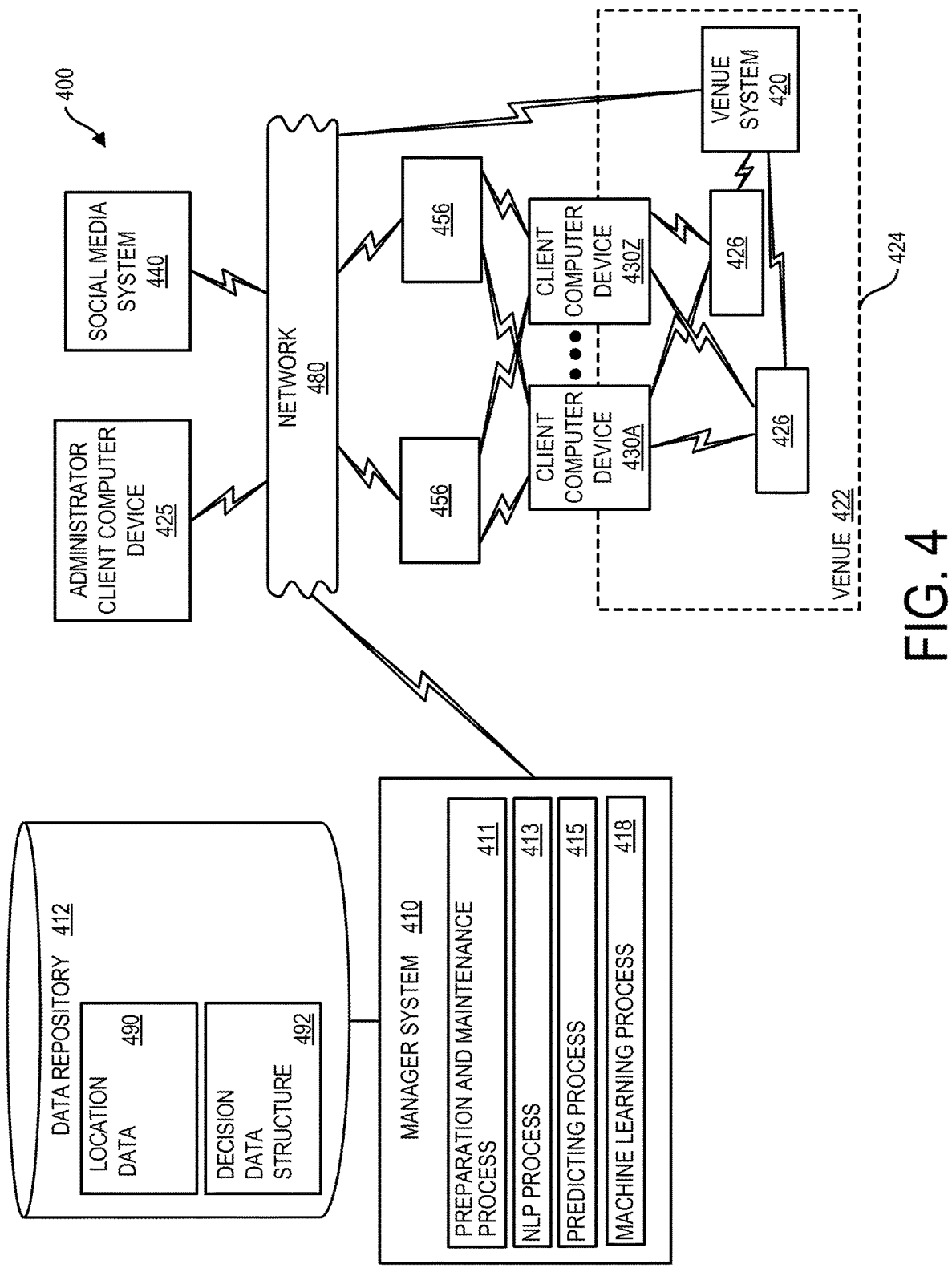
FIG. 4 is a modified block diagram of another example of a venue system, in accordance with one or more aspects of the present disclosure.

In another example, system 400 for use in supporting location based messaging services is shown in FIG. 4. System 400 can include manager system 410 having an associated data repository 412, venue system 420, administrator computer device 425, a plurality of client computer devices 430A-430Z, and social media system 440. Manager system 410, venue system 420, administrator computer device 425, a plurality of client computer devices 430A-430Z, and optional social media system 440 can be in communication with one another via network 480. System 400 includes numerous devices, which may be computing node based devices, connected by a network 480. Network 480 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment manager system 410 can be external to venue system 420 social media system 440 and to each of the one or more client computer device 430A-430Z. In one embodiment manager system 410 can be co-located with venue system 420 and/or social media system 440. In one embodiment manager system 410 can be co-located with one or more client computer device 430A-430Z.

Referring further to FIG. 4, venue system 420 can be located in venue 422 that is delimited by venue geographical border 424 that specifies the geographical coordinate area occupied by venue 422. In one embodiment, an organizational entity that operates manager system 410 can be in common with the organizational entity that operates venue system 420 and venue 422. Venue 422 can be, for example, a retail or restaurant establishment venue in one embodiment. Venue system 420 can be disposed in venue 422 defined by geographical boundary 424.

Client computer devices 430A-430Z can be mobile computer devices, moveable between locations, internal and external to venue 422, and thus are shown in FIG. 4 as being partially disposed within geographical boundary 424 and partially disposed external to geographical boundary 424. Client computer devices 430A-430Z can be, for example, wireless computer devices that can be connected to network 480 by, for example, alternative radio communication protocols. In one example, client computer devices 430A-430Z can connect to network 480 via connection nodes 456. Connection nodes 456 may, for example, facilitate connection to a cellular communication network. Client computer devices 430A-430Z can also be connected to network 480, for example, via connection nodes 426. Connection nodes 426 can be provided by, for example, IEEE 802.11 access points of a WIFI wireless network provided by an operator of venue system 420, in which operator can be the operator of venue 422 and manager system 410.

In one example, each client computer device 430A-430Z can be associated with a certain user. In one embodiment, each user of system 400 is, for example, a registered user of a retail vendor that operates a plurality of venues such as venue 422. Users having records stored in data repository 412 can be registered users of manager system 410 and of an enterprise that operates venue 422 can be, for example, customer loyalty card holders of the vendor who receive customer loyalty cards in exchange for data regarding themselves.

In one example, each of the different client computer devices 430A-430Z can be associated with a different user. Regarding one or more client computer device 430A-430Z, a computer device of one or more client computer device 430A-430Z in one embodiment can be a computing node device provided by a client computer, e.g., a mobile device, for example, a smartphone or tablet, a laptop, smartwatch or PC that runs one or more programs, including, e.g., a web browser for opening and viewing web pages.

Optional social media system 440 can include a collection of files, including for example, HTML files, CSS files, image files, and JavaScript files. Social media system 440 can be, for example, a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 410 can include a messaging system in one embodiment.

Manager system 410 can run various processes including, for example, preparation and maintenance process 411, Natural Language Processing (NLP) process 413, predicting process 415, notifying process 418 and machine learning process 419.

Data repository 412 can store various data, for example, location data specifying history of locations of client computer devices 430A-430Z, or decision data structures for use in providing artificial intelligence (AI) decisions, for example, cognitive recommendations to users.

The predicting process 415 may employ, for example, a predictive model trained using machine learning to predict subsequent user behaviors based, at least in part, on current user behaviors in the venue and items in the venue interacted with by the user.

Manager system 410 running notifying process 418 can send notifications to users, for example, cognitive recommendations to users via client computer devices 430A-430Z. The notification can include, e.g., a text based notification, for example, specifying another item(s) from within the venue for a user to consider, based, at least in part, on the output of predicting process 415.

In one example, manager system 410 runs a machine learning process 419 that can update one or more process run by manager system 410 based on obtained data to improve and accuracy and/or reliability of the one or more process. In one embodiment, manager system 410 may, for example, use a decision data structure 492 that predicts, in accordance with predicting process 415, one or more behaviors of users. Such a decision data structure may include, for example, user behavior "norms," which may include, for example, most frequent subsequent user behaviors in the aggregate and/or behavioral data of a user currently in the venue.

Manager system 410 in one embodiment can run a plurality of instances of such a decision data structure, each instance for a different user currently in the venue. For each instance of the decision data structure, manager system 410 can vary such behavior norms. Manager system 410 running machine learning process 419 can continually or periodically update the behavioral data and/or user behavior norms of the different instances of the decision data structure. Manager system 410 can monitor behavioral data of the different users to establish and update the different data structures, including, for example, the behavioral norms.

Manager system 410 can run preparation and maintenance process 411 to populate and maintain data of data repository 412 for use by various processes run by manager system 410 including e.g. predicting process 415.

Manager system 410 can run NLP process 413 to process data for preparation of records that are stored in data repository 412 and for other purposes. Manager system 410 can run a Natural Language Processing (NLP) process 413 for determining one or more NLP output parameter of a message. NLP process 413 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 413 manager system 410 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Data repository 412 can include location data area 490 which can include historical data on locations visited by users of system 400. As users move throughout a given venue, their movement can be traced and logged into location data area 490. In one embodiment, location data area 490 can include a table associating users within their respective locations (e.g. given in coordinates) and each location can be associated with a timestamp. Thus, manager system 410 is able to perform a variety of useful analyses, for example, frequency of visiting one or more of the venues.

For providing of location data that specifies a location of users of system 400, system 400 can be configured to provide locating services. Locating services can be, for example, control plane based, self-reported based, local range based or a combination of the noted types. In one embodiment, locating services provided by system 400 can locate a computer device of client computer devices 430A-430Z using, for example, GPS based locating services, located services based on processing of signals received by connection nodes 456 (cellular network), locating services based on processing of signals received by connection nodes 426 (LAN) or a combination of such services.

Data repository 412 can include decision data structures area 492. Within decision data structures area 492, data repository 412 can store decision data structures. In one embodiment, there can be stored in decision data structures area 492, a machine logic artificial intelligence (AI) decision data table that maps predicted user behaviors and actual user behavior corresponding to the predicted user behaviors.

Figure 5:
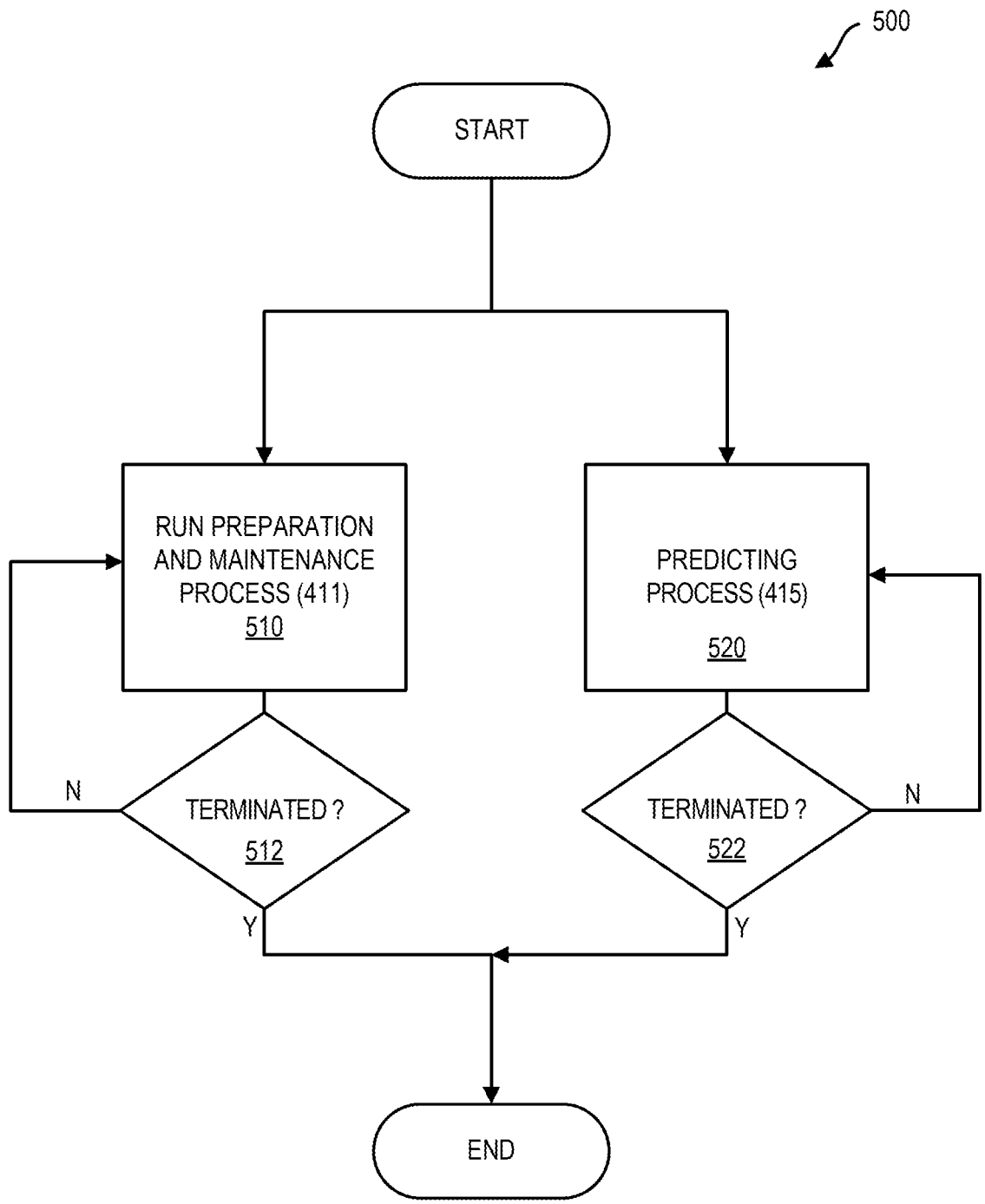
FIG. 5 is a flow diagram of one example of a predicting process, in accordance with one or more aspects of the present disclosure.

FIG. 5 is a flowchart 500 illustrating coordination of processes that can be performed by manager system 410 of FIG. 4, in accordance with one or more embodiments set forth herein. The terms "flowchart" and "flow diagram" are used interchangeably in this disclosure.

At block 510, manager system 410 can run preparation and maintenance process 411 to populate, prepare and maintain various data of data repository 412 including data of locations areas 490 and 492. Manager system 410 can run preparation and maintenance process 411 iteratively until process 411 is terminated at block 512.

At block 520, manager system 410 can run predicting process 415 to determine predicted user behaviors. For support of running of examining process 415 iteratively, manager system 410 can be running, for example, NLP process 413, notifying process 418, and/or machine learning process 419 iteratively. Manager system 410 can run examining process 415 until examining process 415 is terminated at block 522. Manager system 410 can run preparation and maintenance process 411 and examining process 415 concurrently and can run each of process 411 and process 415 iteratively.

Figure 6:
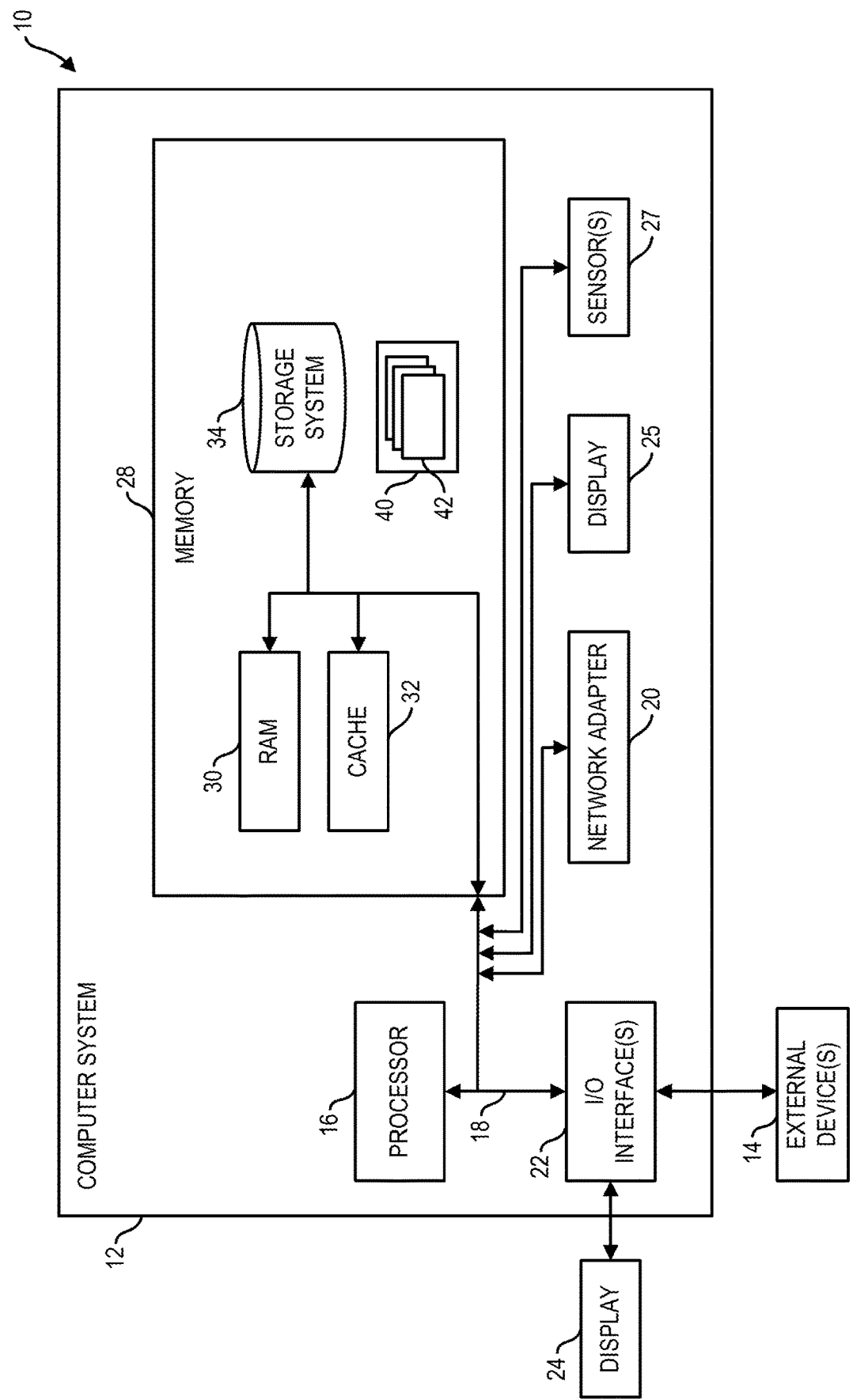
FIG. 6 is a block diagram of one example of a computer system, in accordance with one or more aspects of the present disclosure.
Figure 7:
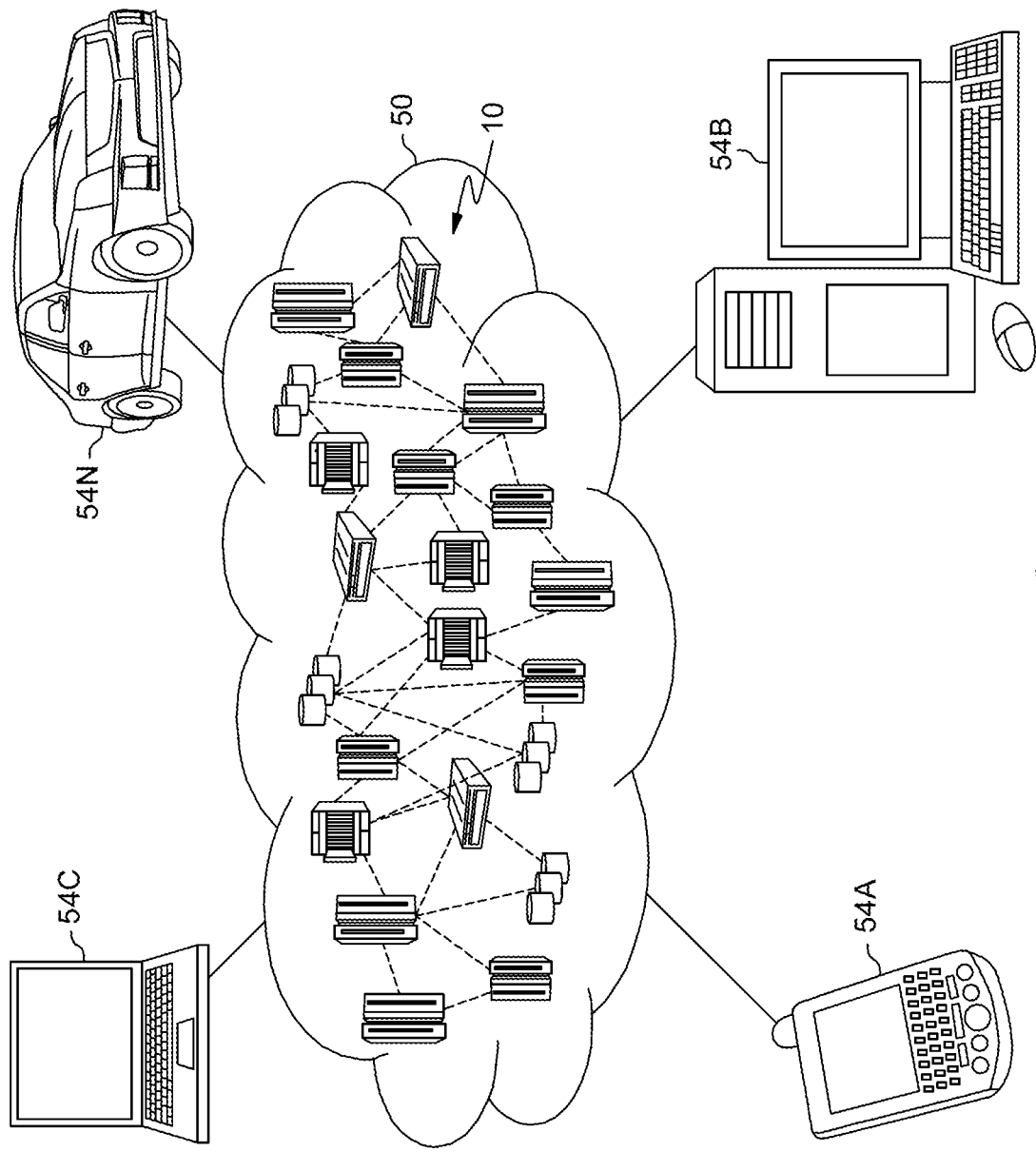
FIG. 7 is a block diagram of one example of a cloud computing environment, in accordance with one or more aspects of the present disclosure.
Figure 8:
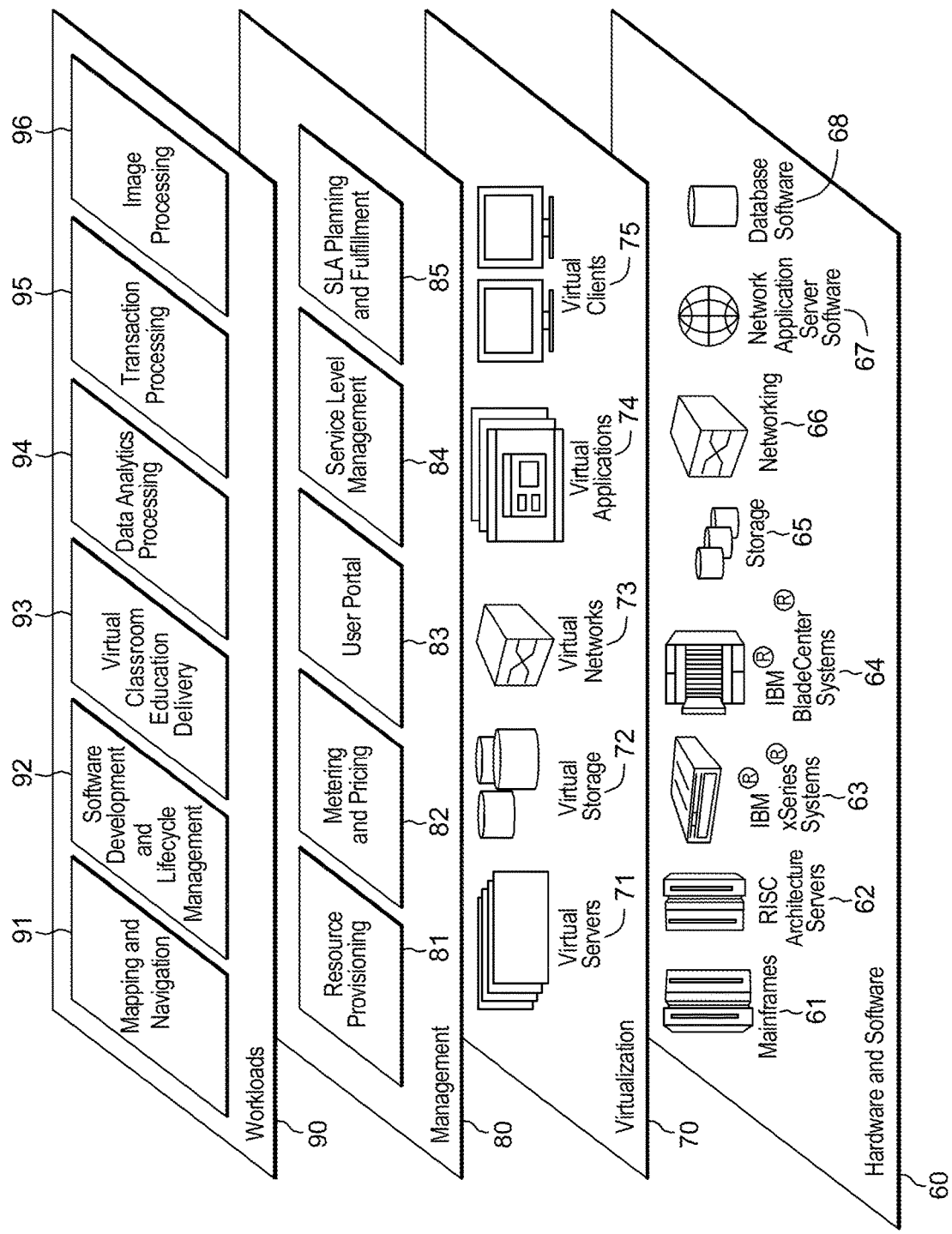
FIG. 8 is a block diagram of one example of functional abstraction layers of the cloud computing environment of FIG. 4, in accordance with one or more aspects of the present disclosure.

FIGS. 6-8 depict various aspects of computing, including a computer system and cloud computing, in accordance with one or more aspects set forth herein.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 500 of FIG. 5 and functions described herein.

In one embodiment, one or more client computer device 430A-430Z (FIG. 4) can include one or more computing nodes 40 and can include one or more program 40 for performing functions described with reference to one or more client computer device 430A-430Z as set forth in the present disclosure. In one embodiment, administrator client computer device 425 can include one or more computing node 40 and can include one or more program 40 for performing functions described with reference to administrator client computer device 425 as set forth in the present disclosure. In one embodiment, the computing node based systems and devices depicted herein can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data.

Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 10) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements.

Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

Aspects of the present invention and certain features, advantages, and details thereof, are explained herein with reference to the non-limiting examples illustrated in the accompanying drawings. Descriptions of well-known materials, fabrication tools, processing techniques, etc., are omitted so as not to unnecessarily obscure aspects of the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other environments may incorporate and use one or more aspects of the present invention. Further, other events may be monitored and/or other actions may be taken in response to the events. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a first aspect, disclosed above is a computer-implemented method of providing recommendations. The computer-implemented method includes monitoring, by machine logic, during a visit to a venue by a user, user behavior(s) associated with user interaction(s) with item(s) in the venue, a location of the item(s) being tracked within the venue, and predicting, by machine logic, in real-time, based, at least in part, on the user behavior(s) and the item(s), subsequent behavior(s) of the user, the predicting resulting in predicted behavior(s). The computer-implemented method further includes providing, by machine logic, cognitive recommendation(s) in real-time to the user during the visit, the cognitive recommendation(s) corresponding to additional item(s) based, at least in part, on the predicted behavior(s) and the item(s).

In one example, the computer-implemented method may further include, for example, in response to the monitoring, updating a database of user behaviors with the user behavior(s). In one example, the user may be, for example, identified in the database of user behaviors. In another example, a location for the venue may be, for example, associated with the user behavior(s) in the database of user behaviors, and the recommendation(s) may be, for example, based, in part, on the location.

In one example, the computer-implemented method may further include, for example, identifying characteristic(s) of the user, and updating the user database with the characteristic(s). The characteristic(s) may include, for example, at least one of an identity of the user and an identification of at least one physical characteristic of the user. In one example, the characteristic(s) may include, for example, at least one of identifying the user and identifying the physical characteristic(s) of the user.

In one example, the providing in the computer-implemented method of the first aspect may include, for example, searching cross co-occurrence matrix(es) based, at least in part, on the user behavior(s), the cross co-occurrence matrix(es) used in making the cognitive recommendation(s).

In one example, the providing the one cognitive recommendation(s) in the computer-implemented method of the first aspect may include, for example, continually updating the cognitive recommendation(s).

In one example, the computer-implemented method of the first aspect may further include, for example, using machine learning to teach with data and improve the one or more cognitive recommendation(s).

In a second aspect, disclosed above is a system for providing recommendation. The system includes a memory(ies), and processor(s) in communication with the memory(ies) to perform a method, the method including monitoring, by the system, during a visit to a venue by a user, user behavior(s) associated with user interaction(s) with item(s) in the venue, a location of the item(s) being tracked within the venue, and predicting, by the system, in real-time, based, at least in part, on the user behavior(s) and the item(s), subsequent behavior(s) of the user, the predicting resulting in predicted behavior(s). The method further includes providing, by the system, cognitive recommendation(s) in real-time to the user during the visit, the cognitive recommendation(s) corresponding to additional item(s) based, at least in part, on the predicted behavior(s) and the item(s).

In one example, the system may further include, for example, in response to the monitoring, updating a database of user behaviors with the user behavior(s). In one example, the user may be, for example, identified in the database of user behaviors.

In one example, the system of the second aspect, having a database of user behaviors, may further include, for example, identifying characteristic(s) of the user, updating the user database with the characteristic(s), and the characteristic(s) may include, for example, at least one of an identity of user and an identification of physical characteristic(s) of the user.

In one example, the predicting in the system of the second aspect may include, for example, searching cross co-occurrence matrix(es) based, at least in part, on the user behavior(s), the cross co-occurrence matrix(es) used in making the cognitive recommendations.

In one example, the system of the second aspect may further include, for example, using machine learning to teach with data and improve the one or more cognitive recommendation(s).

In a third aspect, disclosed above is a computer program product. The computer program product includes a non-transitory storage medium readable by a processor and storing instructions for performing a method of providing recommendations, the method including monitoring, by machine logic, during a visit to a venue by a user, user behavior(s) associated with user interaction(s) with item(s) in the venue, a location of the item(s) being tracked within the venue, and predicting, by machine logic, in real-time, based, at least in part, on the user behavior(s) and the item(s), subsequent behavior(s) of the user, the predicting resulting in predicted behavior(s), and providing, by machine logic, cognitive recommendation(s) in real-time to the user during the visit, the cognitive recommendation(s) corresponding to additional item(s) based, at least in part, on the predicted behavior(s) and the item(s).

In one example, the computer program product may further include, for example, in response to the monitoring, updating a database of user behaviors with the user behavior(s). In one example, the user may be, for example, identified in the database of user behaviors.

In one example, the computer program product, using a database of user behaviors, may further include, for example, identifying characteristic(s) of the user, updating the user database with the characteristic(s), and the characteristic(s) may include, for example, at least one of identifying the user and identifying the physical characteristic(s) of the user.

In one example, the providing in the computer program product of the third aspect may include, for example, searching cross co-occurrence matrix(es) based, at least in part, on the user behavior(s), the cross co-occurrence matric(es) used in making the cognitive recommendation(s).

In one example, the providing in the computer program product of the third aspect may further include, for example, using machine learning to teach with data and improve the one or more cognitive recommendation(s).

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of providing recommendations, the method comprising:
   monitoring, by machine logic, during a visit to a venue by a user, at least one user behavior associated with one or more user interactions with one or more items in the venue, wherein a location of the one or more items is tracked within the venue;
   predicting, by machine logic, in real-time, at least one subsequent behavior of the user, the predicting being based on at least two considerations, the at least two considerations comprising the at least one user behavior and the one or more items, and wherein the predicting results in at least one predicted behavior of the user interacting with the one or more items; and
   providing, by machine logic, one or more cognitive recommendations in real-time to the user during the visit, the one or more cognitive recommendations corresponding to at least one additional item based on two or more considerations, the two or more considerations comprising the at least one predicted behavior and the one or more items, wherein the providing comprises searching on or more cross co-occurence matrixes based on the one or more user interactions and the one or more items, and wherein results of the searching are used in formulating the one or more cognitive recommendations.

2. The computer-implemented method of claim 1, further comprising, in response to the monitoring, updating a database of user behaviors with the at least one user behavior.

3. The computer-implemented method of claim 2, wherein the user is identified in the database of user behaviors.

4. The computer-implemented method of claim 2, wherein a location for the venue is associated with the at least one user behavior in the database of user behaviors, and wherein the one or more recommendations is based, in part, on the location.

5. The computer-implemented method of claim 2, further comprising:
   identifying one or more characteristics of the user;
   updating the user database with the one or more characteristics; and
   wherein the one or more characteristics comprise at least one of an identity of the user and an identification of at least one physical characteristic of the user.

6. The computer-implemented method of claim 5, wherein the one or more characteristics comprise at least one of a user ID and the at least one physical characteristic of the user.

7. The computer-implemented method of claim 1, wherein providing the one or more cognitive recommendations comprises continually updating the one or more cognitive recommendations.

8. The computer-implemented method of claim 1, further comprising using machine learning to teach with data and improve the one or more cognitive recommendations.

9. A system for providing recommendations, the system comprising:
   a memory storage device; and
   a computing device comprising at least one processor in communication with the memory storage device to perform a method, the method comprising:
   monitoring, by the system, during a visit to a venue by a user, at least one user behavior associated with one or more user interactions with one or more items in the venue, wherein a location of the one or more items is tracked within the venue;
   predicting, by machine logic, in real-time, at least one subsequent behavior of the user, the predicting being based on at least two considerations, the at least two considerations comprising the at least one user behavior and the one or more items, and wherein the predicting results in at least one predicted behavior of the user interacting with the one or more items; and
   providing, by machine logic, one or more cognitive recommendations in real-time to the user during the visit, the one or more cognitive recommendations corresponding to at least one additional item based on two or more considerations, the two or more considerations comprising the at least one predicted behavior and the one or more items, wherein the providing comprises searching on or more cross co-occurence matrixes based on the one or more user interactions and the one or more items, and wherein results of the searching are used in formulating the one or more cognitive recommendations.

10. The system of claim 9, further comprising, in response to the monitoring, updating a database of user behaviors with the at least one user behavior.

11. The system of claim 10, wherein the user is identified in the database of user behaviors.

12. The system of claim 10, further comprising:
identifying one or more characteristics of the user;
updating the user database with the one or more characteristics; and
wherein the one or more characteristics comprise at least one of an identity of the user and an identification of at least one physical characteristic of the user.

13. The system of claim 9, further comprising using machine learning to teach with data and improve the one or more cognitive recommendations.

14. A computer program product for providing recommendations, the computer program product comprising:
a non-transitory storage medium readable by a processor and storing instructions for performing a method of providing recommendations, the method comprising:
monitoring, by machine logic, during a visit to a venue by a user, at least one user behavior associated with one or more user interactions with one or more items in the venue, wherein a location of the one or more items is tracked within the venue;
predicting, by machine logic, in real-time, at least one subsequent behavior of the user, the predicting being based on at least two considerations, the at least two considerations comprising the at least one user behavior and the one or more items, and wherein the predicting results in at least one predicted behavior of the user interacting with the one or more items; and
providing, by machine logic, one or more cognitive recommendations in real-time to the user during the visit, the one or more cognitive recommendations corresponding to at least one additional item based on two or more considerations, the two or more considerations comprising the at least one predicted behavior and the one or more items wherein the providing comprises searching on or more cross co-occurence matrixes based on the one or more user interactions and the one or more items, and wherein results of the searching are used in formulating the one or more cognitive recommendations.

15. The computer program product of claim 14, further comprising, in response to the monitoring, updating a database of user behaviors with the at least one user behavior.

16. The computer program product of claim 15, wherein the user is identified in the database of user behaviors.

17. The computer program product of claim 14, further comprising using machine learning to learn and improve the one or more cognitive recommendations.

* * * * *